US008565944B1

(12) United States Patent
Gershzohn

(10) Patent No.: US 8,565,944 B1
(45) Date of Patent: Oct. 22, 2013

(54) ALTERNATE DIVERSION AIRPORT PLANNER

(75) Inventor: Gary R. Gershzohn, Laguna Hills, CA (US)

(73) Assignee: The Boeing Company, Chicago, IL (US)

( * ) Notice: Subject to any disclaimer, the term of this patent is extended or adjusted under 35 U.S.C. 154(b) by 759 days.

(21) Appl. No.: 12/577,758

(22) Filed: Oct. 13, 2009

(51) Int. Cl.

| | |
|---|---|
| ***G06F 7/70*** | (2006.01) |
| ***G06F 19/00*** | (2011.01) |
| ***G06G 7/00*** | (2006.01) |
| ***G06G 7/76*** | (2006.01) |

(52) U.S. Cl.
USPC ............ 701/14; 701/1; 701/3; 701/9; 701/24; 701/25; 701/26; 701/400; 701/411; 701/420; 701/515; 701/528; 701/532; 701/533

(58) Field of Classification Search
USPC ................. 701/1, 3–11, 14, 23–27, 400–541; 244/175, 183, 195, 196; 340/947, 979
See application file for complete search history.

(56) References Cited

U.S. PATENT DOCUMENTS

| | | | | |
|---|---|---|---|---|
| 5,398,186 | A * | 3/1995 | Nakhla | 701/16 |
| 5,526,265 | A * | 6/1996 | Nakhla | 701/16 |
| 5,842,142 | A * | 11/1998 | Murray et al. | 701/16 |
| 6,134,500 | A * | 10/2000 | Tang et al. | 701/528 |
| 6,519,527 | B2 * | 2/2003 | Shinagawa | 701/411 |
| 6,542,796 | B1 * | 4/2003 | Gibbs et al. | 701/3 |
| 6,859,694 | B2 * | 2/2005 | Andrews et al. | 701/25 |
| 6,944,536 | B2 * | 9/2005 | Singleton | 701/410 |
| 7,693,614 | B2 * | 4/2010 | Turung | 701/3 |
| 7,874,521 | B2 * | 1/2011 | Shuster | 244/175 |
| 7,904,213 | B2 * | 3/2011 | Coulmeau | 701/3 |
| 8,121,747 | B2 * | 2/2012 | Loots et al. | 701/16 |
| 2004/0073571 | A1 * | 4/2004 | Kumhyr et al. | 707/104.1 |

OTHER PUBLICATIONS

Garmin, "G1000®: Integrated Flight Deck Pilot's Guide: Cessna Caravan," Jan. 2008, 512 pages.
Garmin, "G1000®: Integrated Flight Deck: Cockpit Reference Guide for the Cessna Caravan," Feb. 2008, 110 pages.
Garmin, "G1000™: System Overview for the Beechcraft A36/G36," Jul. 19, 2005, 16 pages.
N. Meuleau et al., "Emergency Landing Planning for Damaged Aircraft," IAAI, 2009, pp. 114-121.

* cited by examiner

*Primary Examiner* — Bhavesh V Amin
(74) *Attorney, Agent, or Firm* — Hope Baldauff, LLC

(57) ABSTRACT

Technologies are described herein for providing a list of alternate diversion airports that is based on up-to-date and accurate information received electronically at the aircraft. The list of alternate diversion airports may be prioritized according to a normal mode when the aircraft is operating under normal flight conditions, or a non-normal mode when the aircraft is operating in an emergency situation. In one aspect of the present disclosure, a system includes an alternate airport diversion planner program that generates the list of alternate diversion airports based on diversion planning information received at an aircraft. The alternate airport diversion planner program subsequently receives periodic updates of the diversion planning information, which is used to update the list of alternate diversion airports that is provided to a pilot of the aircraft.

20 Claims, 5 Drawing Sheets

ALTERNATE DIVERSION AIRPORT PLANNER

FIELD OF THE DISCLOSURE

The present disclosure relates generally to aircraft flight planning, and in particular to automatic flight diversion planning.

BACKGROUND

An aircraft pilot may file an Instrument Flight Rules flight plan that includes one alternate airport indicating where the aircraft may land in the event of a diversion. A diversion may occur if the pilot is alerted by Air Traffic Control (ATC) that the primary destination airport is closed due to inclement weather or traffic delays; if a mechanical or health emergency occurs in flight; or if an aircraft encounters inclement weather en route to the primary destination airport, for example. ATC may request that the pilot confirm the alternate airport or provide another alternate diversion airport. However, current conditions may render the alternate airport previously filed less than optimal. For example, an emergency situation on the aircraft, low fuel conditions, or inclement weather en route to or at the alternate diversion airport may require the pilot to select a different alternate diversion airport than initially filed.

If the pilot chooses to divert to a different alternate diversion airport than initially filed, the pilot is required by federal regulation to inform ATC of the updated alternate diversion airport at which the aircraft will land. The pilot may communicate with the airline operations center to receive various information regarding alternate diversion airports. The pilot may make a selection based on the information received by the pilot. Because requesting and receiving information is a time consuming process, only a limited amount of information may be provided and the information the pilot receives may need to be updated.

It is with respect to these and other considerations that the disclosure made herein is presented.

SUMMARY

Technologies are described herein for providing a list of alternate diversion airports that is based on up-to-date and accurate information received electronically at the aircraft. The list of alternate diversion airports may be prioritized according to a normal mode when the aircraft is operating under normal flight conditions, or a non-normal mode when the aircraft is operating in a non-normal situation.

In one aspect of the present disclosure, a system includes an alternate airport diversion planner program that generates the list of alternate diversion airports based on diversion planning information received at an aircraft. The alternate airport diversion planner program subsequently receives periodic updates of the diversion planning information, which is used to update the list of alternate diversion airports that is provided to a pilot of the aircraft. In one embodiment, the list of alternate diversion airports may be generated based on diversion planning information received at the aircraft and a current mode of the aircraft.

It should be appreciated that the above-described subject matter may also be implemented in various other embodiments without departing from the spirit of the disclosure. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
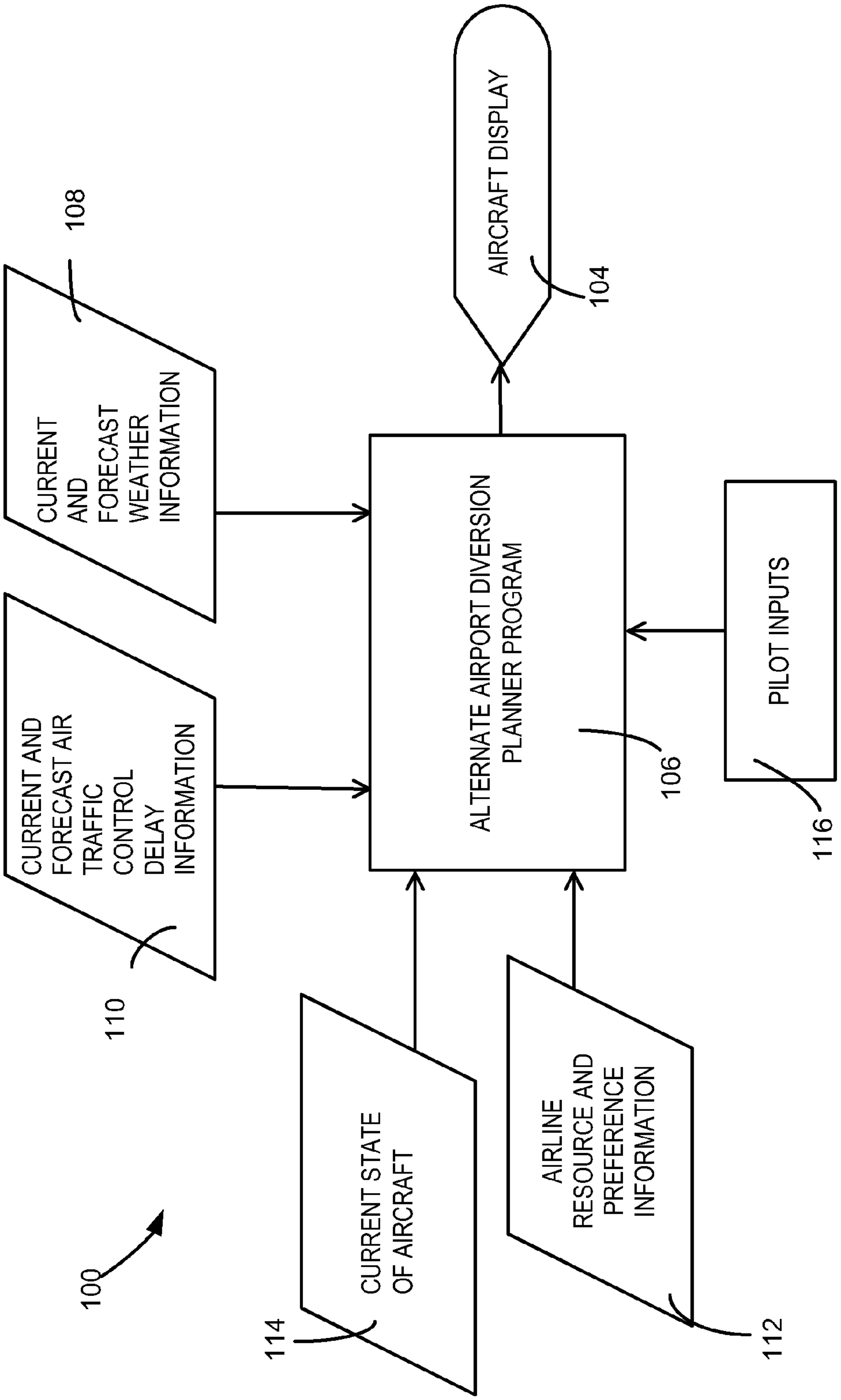
FIG. 1 is a data architecture diagram showing various aspects of an automated airport diversion planning system of an aircraft, according to embodiments presented herein.

The following detailed description is directed to technologies for providing an accurate, up-to-date list of alternate diversion airports from which a pilot of an aircraft may select an alternate diversion airport in the event that the aircraft cannot land at the primary destination airport. The present disclosure described herein overcomes several problems that arise in current aircraft systems. For instance, existing onboard solutions do not automatically and continuously provide complete, accurate and real-time information to the pilot. This may be due to the lack of access to essential off-board information by the pilot and airline, such as severe weather and ATC delays. Also, obtaining information on alternate airports or information on multiple routes to multiple alternate airports from a flight management computer is a time-consuming process for the pilot. This may divert the pilot's attention from tasks that should otherwise engage the pilot, such as an emergency situation, where the pilot has little or no time to spare.

Another problem facing existing systems is the lack of availability of complete results of automated calculations for multiple alternate airports. For example, some current systems can only use the effect of wind (which is used to calculate time and fuel data) for one airport at a time. For the pilot to obtain accurate information on multiple alternate airports, it may be necessary for the pilot to enter wind data into the flight management computer for each airport separately. This is also a time-consuming process that may interfere with higher-priority pilot tasks.

Accordingly, the problems faced by pilots using existing systems may be overcome by implementing the automated airport diversion planning system described herein. The automated airport diversion planning system may electronically receive diversion planning information that is periodically updated and utilized to generate a list of alternate diversion airports from complete and accurate data. Further, the automated airport diversion planning system may be utilized to calculate one or more flight parameters and further prioritize the list of alternate diversion airports based on the calculated flight parameters.

In the following detailed description, references are made to the accompanying drawings that form a part hereof, and that show, by way of illustration, specific embodiments or examples. In the drawings, like numerals represent like elements through the several figures.

FIG. 1 is a data architecture diagram showing various aspects of an automated airport diversion planning system 100 of an aircraft. The automated airport diversion planning system 100 includes algorithms, modules and programs for performing the various operations described herein. According to embodiments, the automated diversion planning system 100 includes an alternate airport diversion planner program 106 configured to provide a list of alternate diversion airports to a pilot of the aircraft, such that the pilot can select an alternate diversion airport from the list of alternate diversion airports at which to land in the event that the aircraft cannot land at the primary destination airport.

The alternate airport diversion planner program 106 may be configured to receive diversion planning information from various input sources located within the aircraft and outside the aircraft. Diversion planning information may include any information that may be used by the alternate airport diversion planner program 106 for generating and prioritizing the list of alternate diversion airports. The alternate airport diversion planner program 106 may receive current and forecast weather information 108 from a weather provider, such as the National Weather Service or other aviation weather services. The current and forecast weather information 108 may include current and forecast weather information and severe weather alerts at alternate diversion airports and along the route between the current position of the aircraft and alternate diversion airports. The current and forecast weather information 108 may be received electronically, such as via an uplink into the automated airport diversion planning system 100, which is then provided to the alternate airport diversion planner program 106. The current and forecast weather information 108 may also be input manually by the pilot.

The alternate airport diversion planner program 106 may also receive current and forecast ATC delay information 110 at the alternate diversion airports and along the route between the current position of the aircraft and the alternate diversion airports. The information may be received electronically from an ATC source, such as the Federal Aviation Authority (FAA) air traffic control system command center in the United States of America, or the EUROCONTROL Central Flow Management Unit in Europe. The current and forecast air traffic control delay information 110 may include traffic delays at alternate diversion airports and holding times for aircraft landing at the alternate diversion airports. In addition, the number of aircraft in-queue for landing and take-off may be relayed to the alternate airport diversion planner program 106 to be used in calculating the flight parameters associated with the list of alternate diversion aircrafts.

According to embodiments, the alternate airport diversion planner program 106 may also receive airline resource and preference information 112 at alternate diversion airports from an airline operations center. Airline resource and preference information 112 may include information relating to the airline, such as the number of ground staff at the alternate diversion airports, availability of aircraft crews and personnel, dedicated gates and ticketing counters, as well as airline preference information, amongst others.

The alternate airport diversion planner program 106 may also receive the current state of the aircraft 114 from data gathering instrumentation onboard the aircraft. The current state of the aircraft 114 may include information pertaining to fuel levels of the aircraft; the current weight of the aircraft; whether any of the components of the aircraft are non-operational, such as the anti-skid braking system; and the like.

The automated airport diversion planning system 100 is also configured to receive pilot inputs 116 from an input controller. The pilot inputs 116 may include selection choices and/or other input information to the alternate airport diversion planner program 106. In one embodiment, the pilot inputs 116 include a selection of a mode for generating a list of alternate diversion airports, such as a normal mode or a non-normal mode, as will be described below in FIG. 2. The pilot inputs 116 may also include a selection of an alternate diversion airport from the list of alternate diversion airports. In addition, pilot inputs 116 may allow the pilot to filter alternate diversion airports from the list of alternate diversion airports using a variety of filter settings.

The alternate airport diversion planner program 106 may also be configured to provide the pilot with flight planning and alternate diversion airport information, such as weather information and ATC delay information at alternate diversion airports and flight routes to alternate diversion airports. In addition, the alternate airport diversion planner program 106 may provide one or more flight parameters to the pilot for each alternate diversion airport in the list of alternate diversion airports. According to embodiments, the list of alternate diversion airports may be generated and prioritized based on the one or more flight parameters, as will be described in further detail below.

In various embodiments, the alternate airport diversion planner program 106 may be configured to display the list of alternate diversion airports and/or the flight parameters associated with each alternate diversion airport on an aircraft display 104. The list of alternate diversion airports and flight parameters associated with each of the alternate diversion airports may be displayed on a control display unit (CDU), as will be described in regard to FIG. 2. The alternate airport diversion planner program 106 may also display information related to alternate diversion airports on a navigation display (ND), as will be described in regard to FIG. 3. It should be appreciated that the alternate airport diversion planner program 106 may display information related to the alternate diversion airports on any aircraft display, including the primary flight display, the multifunction display unit, the electronic flight bag, and the like. It will also be appreciated that the alternate airport diversion planner program 106 may include all, some or none of the flight parameters for each alternate diversion airport in the various displays, as will be further described herein.

Figure 2:
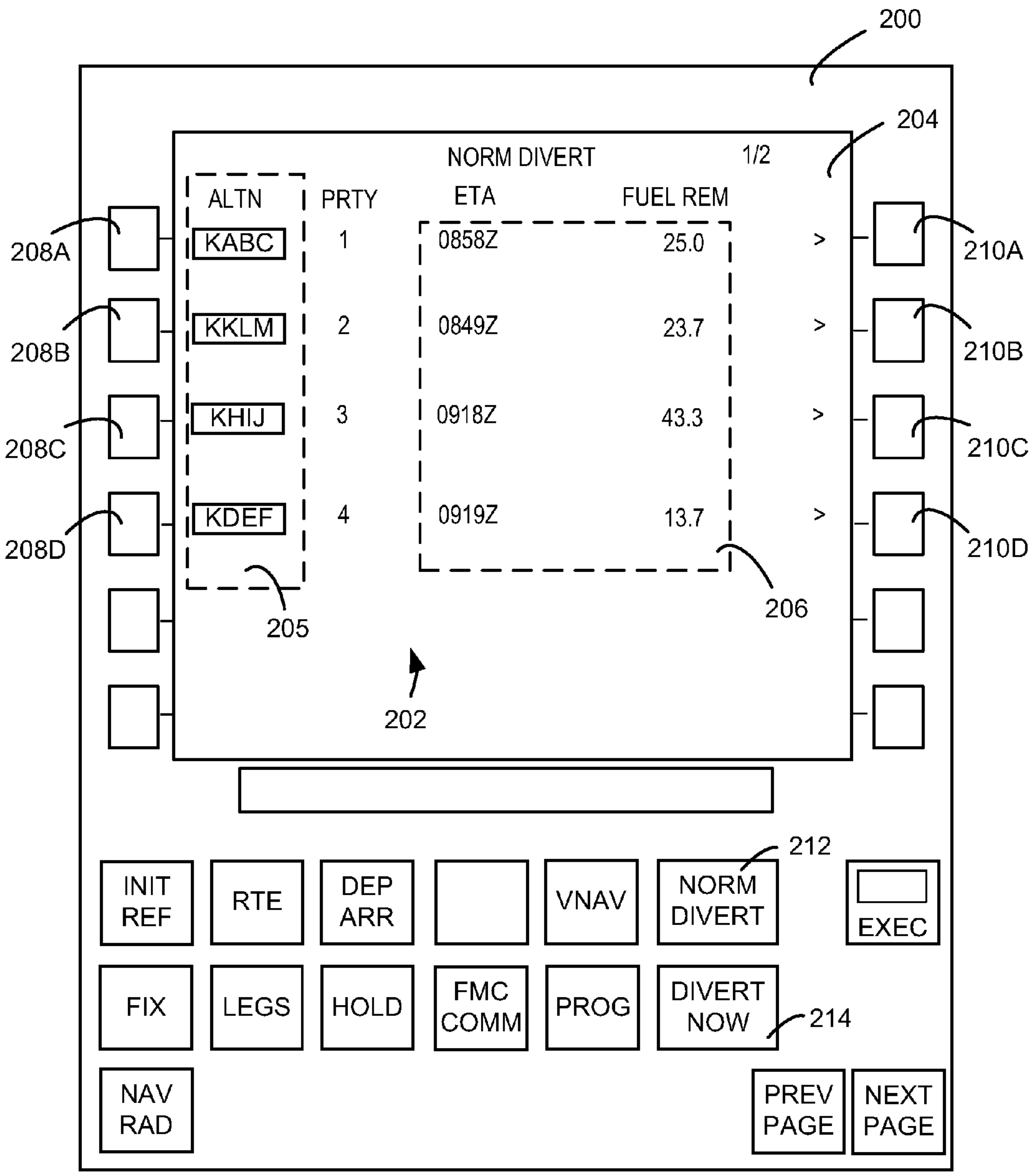
FIG. 2 is an illustration of a control display unit of the aircraft displaying alternate diversion airport information, according to embodiments presented herein.

FIG. 2 shows an illustration of a CDU 200 displaying a list of alternate diversion airports 202, according to embodiments. The CDU 200 includes a CDU display 204 that shows the list of alternate diversion airports 202, including a number of alternate diversion airports 205 and flight parameters 206 associated with each alternate airport. According to embodiments, the alternate airport diversion planner program 106 calculates the flight parameters 206 using the diversion planning information received by the program. The flight parameters 206 may include route and altitude options to the alternate diversion airport, estimated time of arrival (ETA) at the alternate diversion airport, estimated fuel en route to the alternate diversion airport, estimated fuel remaining upon arrival at the alternate diversion airport, estimated landing weight upon arrival at the alternate diversion airport, maximum allowable landing weight at the alternate diversion airport, and the amount of fuel to jettison to reach the maximum allowable landing weight, amongst others.

The list of alternate diversion airports 202 may be generated and prioritized according to one or more of the flight parameters 206 using the updated diversion planning information and the current state of the aircraft 112, based on an algorithm defined by the alternate airport diversion planner program 106. By prioritizing the list of alternate diversion airports 202 and providing the pilot with a ranked list of alternate diversion airports, the pilot can select an appropriate alternate diversion airport without having to perform additional calculations. According to embodiments, the flight parameters 206 may determine the prioritization of the list of alternate diversion airports 202. For instance, an alternate diversion airport having an earlier ETA may be given a higher priority than airports having a later ETA. In embodiments, the value of one or more flight parameters may further eliminate an airport from inclusion in the list of alternate diversion airports 202. For instance, if the estimated fuel remaining upon arrival at the alternate diversion airport is below a threshold amount, say 1500 pounds of fuel, the airport may not be included in the list of alternate diversion airports 202 presented to the pilot. In some embodiments, the threshold amount may be defined by the airline, the pilot, or the FAA. The threshold amount may also vary for each airport, and this information may be received from either the ATC, the airline operations center, or stored in the aircraft. Those skilled in the art will appreciate that many flight parameters 206 may be taken into consideration for both the generation and prioritization of the list of alternate diversion airports 202.

The CDU 200 may include buttons 208A-D, which are configured to select an alternate diversion airport from the list of alternate diversion airports 202. Additional buttons 210A-D may be provided that are configured to scroll the information for the corresponding alternate diversion airport. The CDU 200 also includes other buttons and input options for performing various other functions. In one embodiment, the CDU 200 includes a normal diversion button 212 and a non-normal diversion button 214, as further shown in FIG. 2. The normal diversion button 212 and the non-normal diversion button 214 allow the pilot to select a normal mode or non-normal mode for the generation and prioritization of the list of alternate diversion airports 202.

The non-normal mode may cause the alternate airport diversion planner program 106 to generate and prioritize a non-normal list of alternate diversion airports using a set of flight parameters 206 that are directed towards assisting the pilot select an alternate diversion airport for a non-normal landing, such as an emergency landing. Accordingly, the prioritization of the non-normal list of alternate diversion airports may give more weight to one or more flight parameters related to an earliest estimated time of arrival, availability of an emergency crew on site, traffic at the airport, length of runways, and resources for handling an emergency crisis, for example. In various embodiments, the non-normal list of alternate diversion airports may include the same flight parameters as the normal list of alternate diversion airports 202 but the flight parameters may be weighted differently in the prioritization to account for factors that are important when making a non-normal landing. In other embodiments, the alternate airport diversion planner program 106 may employ different formulas or algorithms to generate and prioritize the list of alternate diversion airports 202 according to other pilot inputs or preferences of an aircraft or airline.

Figure 3:
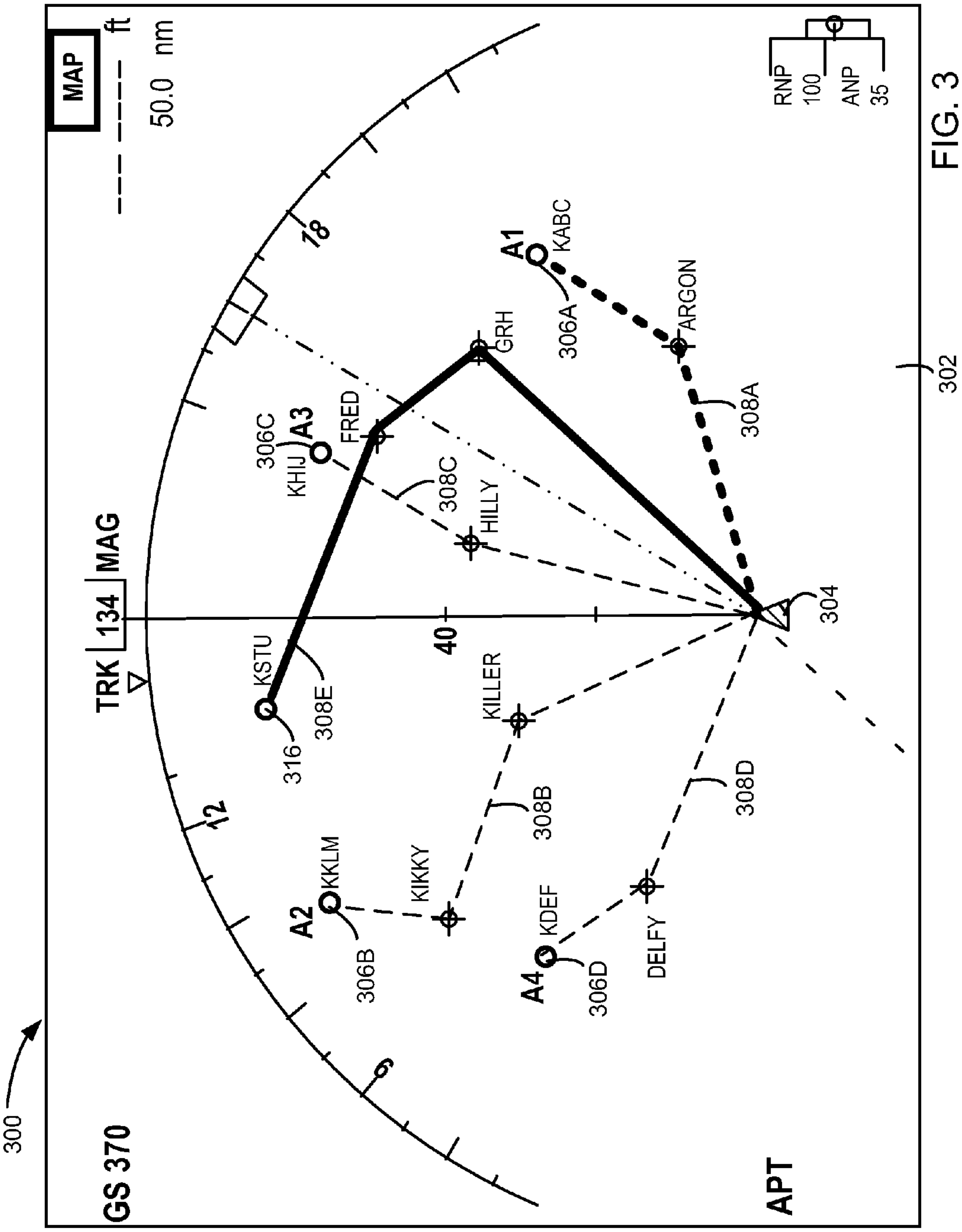
FIG. 3 is a screen image of a navigation display of the aircraft displaying alternate diversion airport information, according to embodiments presented herein.

FIG. 3 illustrates a screen image 300 of a navigation display (ND) 302 of the aircraft showing information regarding the alternate diversion airports in the list of alternate diversion airports. The ND 302 may display the various alternate diversion airports 306A-306D (referred to herein generally as alternate diversion airport 306) from the list of alternate diversion airports displayed in the CDU 200 shown in FIG. 2. The ND 302 may also display symbols indicating the priority of the alternate diversion airports 306. Further, the ND 302 displays an ownship position indicator 304 indicating the current position of the aircraft in relation to the other navigation points displayed.

The ND 302 may also display the routes 308A-308E of the aircraft from the current position to the primary destination airport 316 and the alternate diversion airports 306 contained in the list of alternate diversion airports 202. In various embodiments, the route 308A between the current position and the first alternate airport 306A may be highlighted indicating the route 308A to the preferred alternate diversion airport as suggested by the alternate airport diversion planner program 106. It should be appreciated that the ND 302 may display the routes, airports and waypoints using a wide variety of graphical representations beyond those shown in FIG. 3.

According to embodiments, the information may be displayed on the ND 302 in the track-up, the north-up, or any other orientation. The ND 302 may also display one or more of the flight parameters 206 associated with the displayed alternate diversion airports. In various embodiments, the alternate airport diversion planner program 106 may display information regarding alternate diversion airports on any map display.

It should be appreciated that the alternate airport diversion planner program 106 is configured to periodically receive updated diversion planning information from the various sources while in flight. Further, as the aircraft continues along its current route, the current state of the aircraft is also changing. Accordingly, the alternate airport diversion planner program 106 periodically updates the list of alternate diversion airports 202 based on the updated diversion planning information received by the program. According to embodiments, the frequency at which the list of alternate diversion airports is updated may vary based upon the frequency at which the diversion planning information is updated. In one embodiment, the diversion planning information is updated continuously, thereby allowing the alternate airport diversion planner program 106 to generate and prioritize an up-to-date and accurate list of alternate diversion airports 202 in near real-time.

It should be appreciated that when the list of alternate diversion airports 202 is updated, some airports in the list may be removed because the flight parameters of that particular airport no longer meet the criteria applied by the alternate airport diversion planner program 106, while new airports may be added since the flight parameters of those airports now meet the criteria. In addition, the priority of the list of alternate diversion airports 202 may also change based on the current state of the aircraft 114 and the updated diversion planning information received by the alternate airport diversion planner program 106. As a result, the ND 302 shown in FIG. 3 may be dynamically changing as updated diversion planning information is received by the alternate airport diversion planner program 106. Similarly, the information displayed on the CDU 200 shown in FIG. 2 is also updated accordingly.

Figure 4:
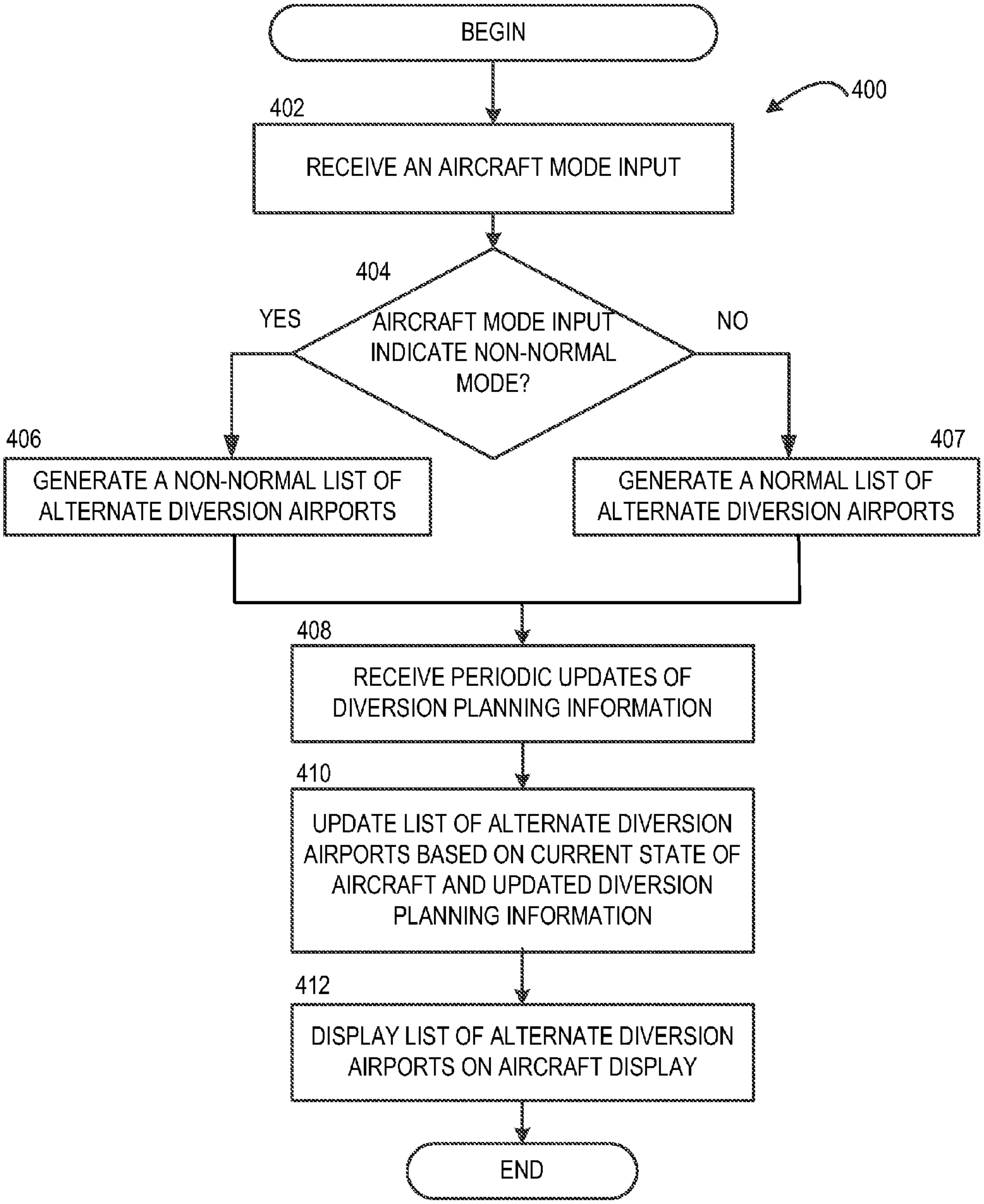
FIG. 4 is a logical flow diagram illustrating a routine for displaying alternate diversion airport information on an aircraft display, according to embodiments presented herein.

Turning now to FIG. 4 additional details will be provided regarding embodiments presented herein for displaying alternate diversion airport information on an aircraft display. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other operating parameters of the computing system. Accordingly, the logical operations described herein are referred to variously as operations, structural devices, acts, or modules. These operations, structural devices, acts and modules may be implemented in software, in firmware, hardware, in special purpose digital logic, and any combination thereof. It should also be appreciated that more or fewer operations may be performed than shown in the figures and described herein. These operations may also be performed in parallel, or in a different order than those described herein.

FIG. 4 shows a routine 400 for displaying alternate diversion airport information on a display of the aircraft based on diversion planning information and an aircraft mode received from the pilot. In one embodiment, the routine 400 may be performed by the alternate airport diversion planner program 106. It will be appreciated that the routine 400 may also be performed by other modules or programs in the aircraft or by a combination of modules or programs.

The routine 400 begins at operation 402, where the alternate airport diversion planner program 106 receives the aircraft mode input indicating either the non-normal mode or the normal mode. The aircraft mode input may be received from the pilot by pressing the non-normal diversion button 214 to select the non-normal mode, or by pressing the normal diversion button 212 to select the normal mode, as described in FIG. 2. In one embodiment, the alternate airport diversion planner program 106 receives the aircraft mode input automatically depending upon the current state of the aircraft 114. For example, if the current state of the aircraft 114 indicates a non-normal situation, the alternate airport diversion planner program 106 may select the non-normal mode without a pilot's input. From operation 402, the routine 400 proceeds to operation 404, where the alternate airport diversion planner program 106 determines whether the aircraft mode input received indicates the non-normal mode or the normal mode. If the non-normal mode is indicated, the routine 400 proceeds from operation 404 to operation 406, where the program generates a non-normal list of alternate diversion airports. As described above, the non-normal list of alternate diversion airports is generated using a set of flight parameters 206 that are directed towards assisting the pilot to select an airport for a non-normal landing.

If the alternate airport diversion planner program 106 determines that the normal mode is indicated, the routine 400 proceeds from operation 404 to operation 407, where the alternate airport diversion planner program 106 generates a normal list of alternate diversion airports. As described above, the normal list of alternate diversion airports is generated using flight parameters that are directed towards assisting the pilot to select an airport for a normal landing in the event that the aircraft cannot land at the primary destination airport.

Next, at operation 408, the alternate airport diversion planner program 106 receives periodic updates of the diversion planning information regarding each alternate diversion airport in the list of alternate diversion airports 202. As described above, the diversion planning information may include weather information, ATC delays information and airline resource and preference information. From operation 408, the routine 400 proceeds to operation 410, where the program updates the list of alternate diversion airports 202 according to the updated diversion planning information received by the alternate airport diversion planner program 106. In various embodiments, the currents state of the aircraft 114 is also used to update the list of alternate diversion airports.

From operation 410, the routine 400 proceeds to operation 412, where the updated list of alternate diversion airports 202 is displayed on an aircraft display 104. As described above, the list of alternate diversion airports 202 may be displayed on a CDU 200 as text. Information regarding the alternate diversion airports may be displayed graphically on a map on an ND 302. According to embodiments, the alternate airport diversion planner program 106 may be configured to suggest a preferred alternate diversion airport from the list of alternate diversion airports using a visual indicator. The visual indicator may be a highlight bar or a priority number displayed in proximity to the preferred alternate diversion airport in the list of alternate diversion airports on the CDU 200 for example, or the visual indicator may include a symbol and/or a highlighted route 308 on the ND 302. From operation 412, the routine 400 ends.

Figure 5:
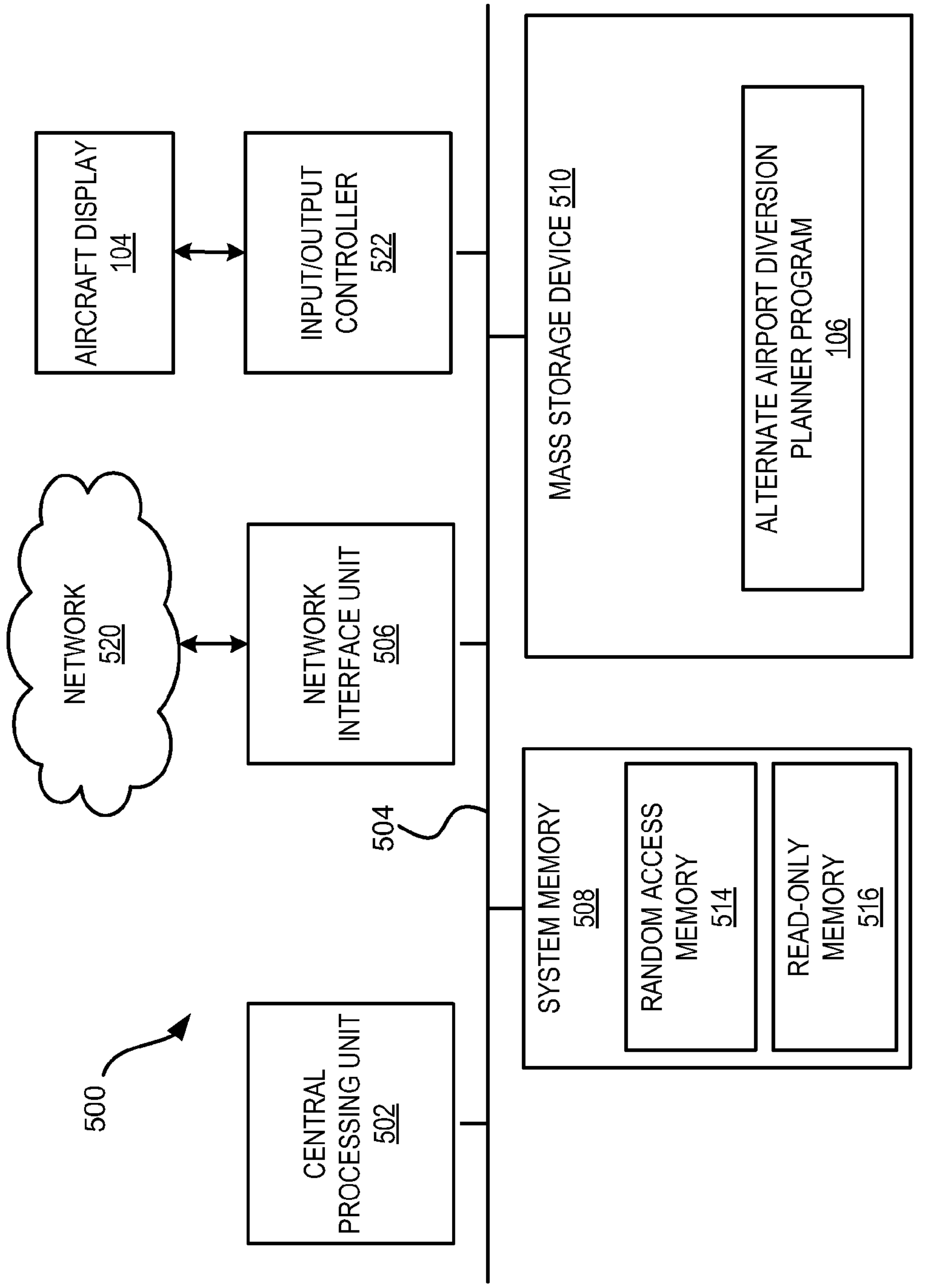
FIG. 5 is a block diagram showing an illustrative computer hardware and software architecture for a computing system capable of implementing aspects of the embodiments presented herein.

FIG. 5 shows an illustrative computer architecture 500 capable of executing the software components described herein for providing an accurate, updated list of alternate diversion airports to a pilot of an aircraft in the manner presented above. The computer architecture 500 includes a central processing unit 502 (CPU), a system memory 508, including a random access memory 514 (RAM) and a read-only memory 516 (ROM), and a system bus 504 that couples the memory to the CPU 502. The CPU 502 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer architecture 500 also includes a mass storage device 510 for storing an operating or control system as well as specific application modules or other program modules, such as the alternate airport diversion planner program 106 described above in regard to FIG. 1. The mass storage device 510 is connected to the CPU 502 through a mass storage controller (not shown) connected to the bus 504. The mass storage device 510 and its associated computer-readable media provide non-volatile storage for the computer architecture 500. The computer architecture 500 may store data on the mass storage device 510 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 510 is characterized as primary or secondary storage, and the like. For example, the computer architecture 500 may store information to the mass storage device 510 by issuing instructions through the storage controller to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer architecture 500 may further read information from the mass storage device 510 by detecting the physical states or characteristics of one or more particular locations within the physical storage units.

Although the description of computer-readable media contained herein refers to a mass storage device, such as a hard disk or CD-ROM drive, it should be appreciated by those skilled in the art that computer-readable media can be any available computer storage media that can be accessed by the computer architecture 500. By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer architecture 500.

According to various embodiments, the computer architecture 500 may operate in a networked environment using logical connections to other aircraft systems and remote computers through a network, such as the network 520. The computer architecture 500 may connect to the network 520 through a network interface unit 506 connected to the bus 504. It should be appreciated that the network interface unit 506 may also be utilized to connect to other types of networks and remote computer systems.

The computer architecture 500 may also include an input-output controller 512 for receiving and processing input from a number of other devices, including a control display unit, an EFIS control panel, a keyboard, mouse, electronic stylus, or touch screen. Similarly, the input-output controller 512 may provide output to an aircraft display 104, a printer, or other type of output device. According to embodiments, the aircraft display 104 may be an ND, a CDU, an electronic flight bag, a primary flight display, a multifunction display unit, or other display device in the aircraft.

Based on the foregoing, it should be appreciated that technologies for providing a list of alternate diversion airports based on up-to-date and accurate information received electronically at the aircraft are provided herein. Although the subject matter presented herein has been described in language specific to computer structural features, methodological acts, and computer-readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. An automated airport diversion planning system of an aircraft, comprising:

a processor;

a memory; and an automated airport diversion planner program stored in the memory that, when executed by the processor, causes the processor to:

generate a list of alternate diversion airports based on diversion planning information received at the aircraft and a current state of the aircraft, periodically and without user input, receive updated diversion planning information at the aircraft from a data input source outside the aircraft, upon receiving the updated diversion planning information, update the list of alternate diversion airports according to the updated diversion planning information received at the aircraft and the current state of the aircraft, and provide the updated list of alternate diversion airports to a pilot of the aircraft.

2. The system of claim 1, wherein the automated airport diversion planner program further causes the processor to:

periodically update the current state of the aircraft; and upon updating the current state of the aircraft, update the list of alternate diversion airports according to the updated current state of the aircraft.

3. The system of claim 1, wherein the diversion planning information comprises one or more of current and forecast weather at alternate diversion airports, current and forecast weather diversion planning information between a current position of the aircraft and the alternate diversion airports, current and forecast air traffic control (ATC) delays at the alternate diversion airports, current and forecast ATC delays between the current position of the aircraft and the alternate diversion airports, and airline preferences for the alternate diversion airports.

4. The system of claim 1, wherein the automated airport diversion planner program further causes the processor to prioritize the list of alternate diversion airports based on the updated diversion planning information received.

5. The system of claim 1, wherein the automated airport diversion planner program further causes the processor to suggest a preferred alternate diversion airport from the list based on the updated diversion planning information and the current state of the aircraft.

6. The system of claim 1, wherein the automated airport diversion planner program further causes the processor to:

receive a non-normal mode input; and upon receiving the non-normal mode input, generate a non-normal list of alternate diversion airports based on the updated diversion planning information received at the aircraft and the current state of the aircraft.

7. The system of claim 1, wherein the automated airport diversion planner program further causes the processor to calculate one or more flight planning parameters for each alternate diversion airport in the list.

8. The system of claim 7, wherein each of the one or more flight planning parameters comprises one of route and altitude options to the alternate diversion airport, estimated time en route to the alternate diversion airport, estimated fuel en route to the alternate diversion airport, estimated fuel remaining upon arrival at the alternate diversion airport, estimated landing weight upon arrival at the alternate diversion airport, maximum allowable landing weight at the alternate diversion airport, and an amount of fuel to jettison to reach the maximum allowable landing weight.

9. The system of claim 8, wherein the automated airport diversion planner program further causes the processor to provide the list of alternate diversion airports to the pilot of the aircraft with the one or more flight planning parameters for each alternate diversion airport.

10. The system of claim 1, wherein the automated airport diversion planner program further causes the processor to receive the updated diversion planning information from an airline operations center.

11. The system of claim 1, wherein the updated list of alternate diversion airports is displayed on an aircraft display on the aircraft.

12. The system of claim 11, wherein the updated list of alternate diversion airports is displayed on a navigation display of the aircraft.

13. A method for providing an up-to-date list of alternate diversion airports to a pilot of an aircraft, the method comprising:

generating with a processor a list of alternate diversion airports based on diversion planning information received at the aircraft;

periodically and without user input, receiving updated diversion planning information at the aircraft from a data input source outside the aircraft;

upon receiving the updated diversion planning information, updating the list of alternate diversion airports according to the updated diversion planning information received at the aircraft; and providing the updated list of alternate diversion airports to the pilot of the aircraft.

14. The method of claim 13, wherein the diversion planning information at the aircraft comprises current and forecast weather at alternate diversion airports, current and forecast weather diversion planning information between a current position of the aircraft and the alternate diversion airports, current and forecast ATC delays at the alternate diversion airports, current and forecast ATC delays between the current position of the aircraft and the alternate diversion airports, airline preferences for the alternate diversion airports, and a current state of the aircraft.

15. The method of claim 13, further comprising:

prioritizing the list of alternate diversion airports based on the updated diversion planning information received; and suggesting a preferred alternate diversion airport from the list based on the updated diversion planning information.

16. The method of claim 13, further comprising:

receiving a non-normal mode input; and upon receiving the non-normal mode input, generating a non-normal list of alternate diversion airports based on the updated diversion planning information received at the aircraft.

17. The method of claim 13, further comprising calculating one or more flight planning parameters for each alternate diversion airport in the list of alternate diversion airports, wherein each of the one or more flight planning parameters comprises one of route and altitude options to the alternate diversion airport, estimated time en route to the alternate diversion airport, estimated fuel en route to the alternate diversion airport, estimated fuel remaining upon arrival at the alternate diversion airport, estimated landing weight upon arrival at the alternate diversion airport, maximum allowable landing weight at the alternate diversion airport, and an amount of fuel to jettison to reach the maximum allowable landing weight.

18. A method for providing an up-to-date list of alternate diversion airports to a pilot of an aircraft, comprising:

receiving an aircraft mode input indicating one of a non-normal mode and a normal mode;

upon receiving the aircraft mode input indicating the non-normal mode, generating a non-normal list of alternate diversion airports based on diversion planning information received at the aircraft, a current state of the aircraft and the aircraft mode input, wherein the non-normal list of alternate diversion airports is prioritized according to a plurality of flight parameters associated with each alternate diversion airport, comprising estimated time of arrival, and availability of an emergency crew on site, aircraft traffic, length of runway, or resources for handling an emergency;

upon receiving the aircraft mode input indicating the normal mode, generating a normal list of alternate diversion airports based on diversion planning information received at the aircraft, a current state of the aircraft and the aircraft mode input;

periodically and without user input, receiving updated diversion planning information at the aircraft from a data input source outside the aircraft, wherein the updated diversion planning information comprises receiving one or more of current and forecast weather at the alternate diversion airports, current and forecast weather diversion planning information between a current position of the aircraft and the alternate diversion airports, current and forecast ATC delays at the alternate diversion airports, current and forecast ATC delays between the current position of the aircraft and the alternate diversion airports, and airline preferences for the alternate diversion airports;

updating at least one of the non-normal list of alternate diversion airports and the normal list of alternate diversion airports according to the updated diversion planning information received at the aircraft, the current state of the aircraft and the aircraft mode input; and providing the updated list of alternate diversion airports to a pilot of the aircraft according to the aircraft mode input.

19. The method of claim 18, further comprising prioritizing the non-normal list of alternate diversion airports and the normal list of alternate diversion airports based on the updated diversion planning information received.

20. The method of claim 18, further comprising suggesting a preferred alternate diversion airport from the non-normal list of alternate diversion airports or the normal list of alternate diversion airports depending on the aircraft mode input received.

* * * * *